(12) United States Patent
Lee

(10) Patent No.: US 6,507,373 B1
(45) Date of Patent: Jan. 14, 2003

(54) VIDEO STABILIZING CIRCUIT FOR DISPLAY APPARATUS

(75) Inventor: Seung-Taek Lee, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/271,278

(22) Filed: Mar. 17, 1999

(30) Foreign Application Priority Data

Mar. 17, 1998 (KR) .............................................. 98-9112

(51) Int. Cl.[7] .................................................. H04N 9/72
(52) U.S. Cl. ........................ 348/692; 348/679; 348/694
(58) Field of Search ................................ 348/377, 379, 348/707, 689, 695, 692, 380, 381, 673, 687, 694

(56) References Cited

U.S. PATENT DOCUMENTS

| | | | | |
|---|---|---|---|---|
| 3,970,895 A | * | 7/1976 | Willis | 315/381 |
| 4,135,200 A | * | 1/1979 | Stanley, II | 358/21 |
| 4,689,679 A | * | 8/1987 | Hinn | 358/168 |
| 4,717,953 A | * | 1/1988 | Chang et al. | 358/34 |
| 4,745,464 A | * | 5/1988 | Gronau et al. | 358/34 |
| 5,714,842 A | * | 2/1998 | Krause et al. | 315/1 |
| 5,894,327 A | * | 4/1999 | Griepentiog | 348/379 |

OTHER PUBLICATIONS

"White Background Level Control Circuit"; IBM Technical Disclosure Bulletin; vol. 32–6A; pp 388–390, Nov. 1989.*

* cited by examiner

Primary Examiner—Victor R. Kostak
(74) Attorney, Agent, or Firm—Robert E. Bushnell, Esq.

(57) ABSTRACT

In a video stabilizing circuit for a display apparatus, the clamp levels of R, G and B chromatic signals are controlled by feeding back the output currents of respective R, G and B terminals so that real time responses can be made, as against the fluctuations of video output load, thereby obtaining high brightness displays. The circuit according to the present invention is characterized in that output currents of R, G and B terminals are fed back from video output sections to clamp level control sections. The potential of a cut-off control terminal of the video pre-amplifier is then varied in such a manner that, if the beam current sensed by the clamp level control section is large, the bias voltage of the chromatic signals is made small. If the beam current sensed by the clamp level control section is small, the bias voltage of the chromatic signals is made large. Therefore, during a high brightness display, fluctuations in the brightness of the high beams and low beams is reduced and display is improved.

31 Claims, 3 Drawing Sheets

VIDEO STABILIZING CIRCUIT FOR DISPLAY APPARATUS

CLAIM OF PRIORITY

This application claims all benefits accruing under 35 U.S.C. § 119 from an application entitled Video Stabilizing Circuit For Display Apparatus earlier filed in the Korean Industrial Property Office on Mar. 17, 1998, and there duly assigned Serial No. 98-9112 by that Office.

BACKGROUND OF THE INVENTION

1. Technical Field

The present invention relates to a video stabilizing circuit for a display apparatus. More specifically, the present invention relates to a video stabilizing circuit for a display apparatus, in which the clamp levels of R, G and B chromatic signals of the video output sections are controlled by feeding back the output currents of respective R, G and B terminals, so that real time responses can be carried out as against the fluctuations of video output load, thereby obtaining high brightness displays.

2. Related Art

Generally, in a display apparatus, the white balance is adjusted by varying the gains of R, G and B chromatic signals which are inputted from a computer system. Thus, dark and bright portions provide clear contrasts.

Further, a cathode ray tube which is used in the display apparatus requires a particular range of brightness value. That is, cut-off voltages of the cathode ray tube are set in accordance with the bias voltages of the R, G and B chromatic signals of the cathode ray tube. The fluctuations of the bias voltages, which fluctuate in accordance with the cut-off voltages thus set, cause fluctuations in brightness.

Recently, display devices have developed to the point where they perform multi-media functions, thereby requiring high brightness and high clarity. Accordingly, many kinds of products having the required functions have appeared. However, one of the technical problems in these products is as follows. When high and low beams are displayed, the video output bias voltages fluctuate, and therefore the brightness of the back-raster fluctuates.

The term "luminance" (brightness) will be briefly described. This term refers to the brightness information for the picture which is to be transmitted to the cathode ray tube for display on the screen. If the brightness is too high, a large anode current flows in the cathode ray tube so as to generate a high voltage. Because of this high voltage, an over-load is imposed on the high voltage driving part. As a result, the switching device of a horizontal output circuit is damaged, or a "doming" phenomenon occurs in the shadow mask tube so as to cause color spreading in the picture.

One of the methods for preventing this phenomenon has been as follows. An automatic beam limit (ABL) circuit is employed to restrict the brightness when high beams and low beams of video signals are displayed.

As another method, in order to adjust the brightness, a switch or a volume switch is used, or a brightness adjusting command is inputted through the keyboard. In this manner, the first grid voltage or the cathode clamp level in the electron gun is varied, thereby adjusting the brightness.

That is, the greater the voltage between the cathode and the first grid, the smaller the amount of the electrons emitted from the cathode, thereby lowering the brightness. On the other hand, the lower the voltage between the cathode and the first grid, the greater the amount of the electrons emitted from the cathode, thereby intensifying the brightness.

However, in such a display apparatus, when high beams and low beams are displayed, the video output levels have to be adjusted manually to adjust the brightness, and this is a troublesome task.

SUMMARY OF THE INVENTION

The present invention is intended to overcome the above described disadvantages.

Therefore it is an object of the present invention to provide a video stabilizing circuit for a display apparatus, in which the clamp levels of R, G and B chromatic signals are controlled by feeding back the output currents of R, G and B terminals, so that real time responses can be made as against the fluctuations of the video output load, thereby making a high brightness display possible.

In achieving the above object, the circuit according to the present invention is characterized in that: the output currents of R, G and B terminals are fed back from video pre-amplifiers to sense the magnitudes of the beam currents by a clamp level control section; and the potential of a cut-off control terminal of the video pre-amplifier is varied in such a manner that, if the sensed beam current is large, the bias voltage of the chromatic signals is made small, and if the beam current is small, the bias voltage of the chromatic signals is made large.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
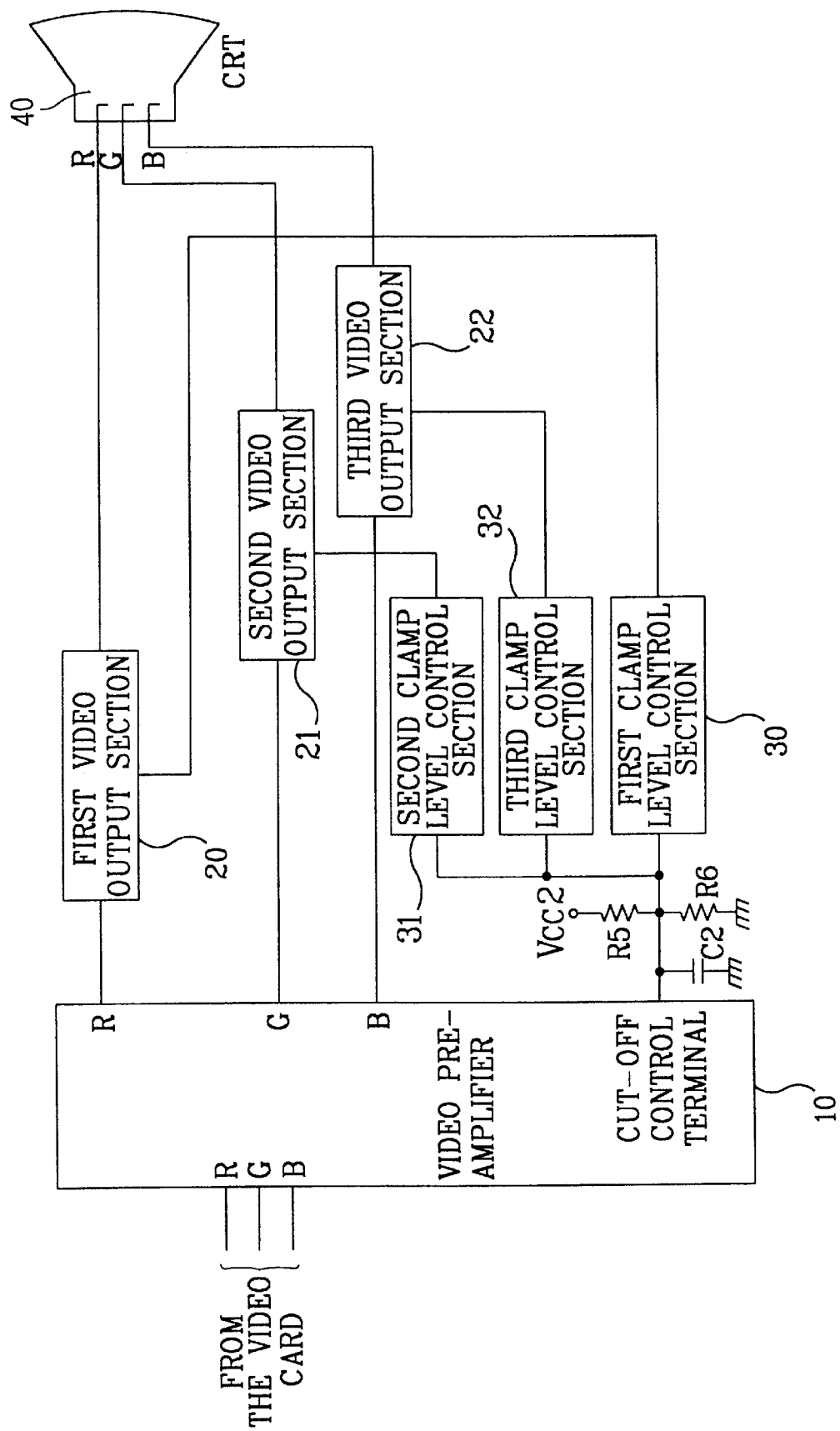
FIG. 1 illustrates a video stabilizing circuit of the display apparatus according to the present invention.
Figure 2:
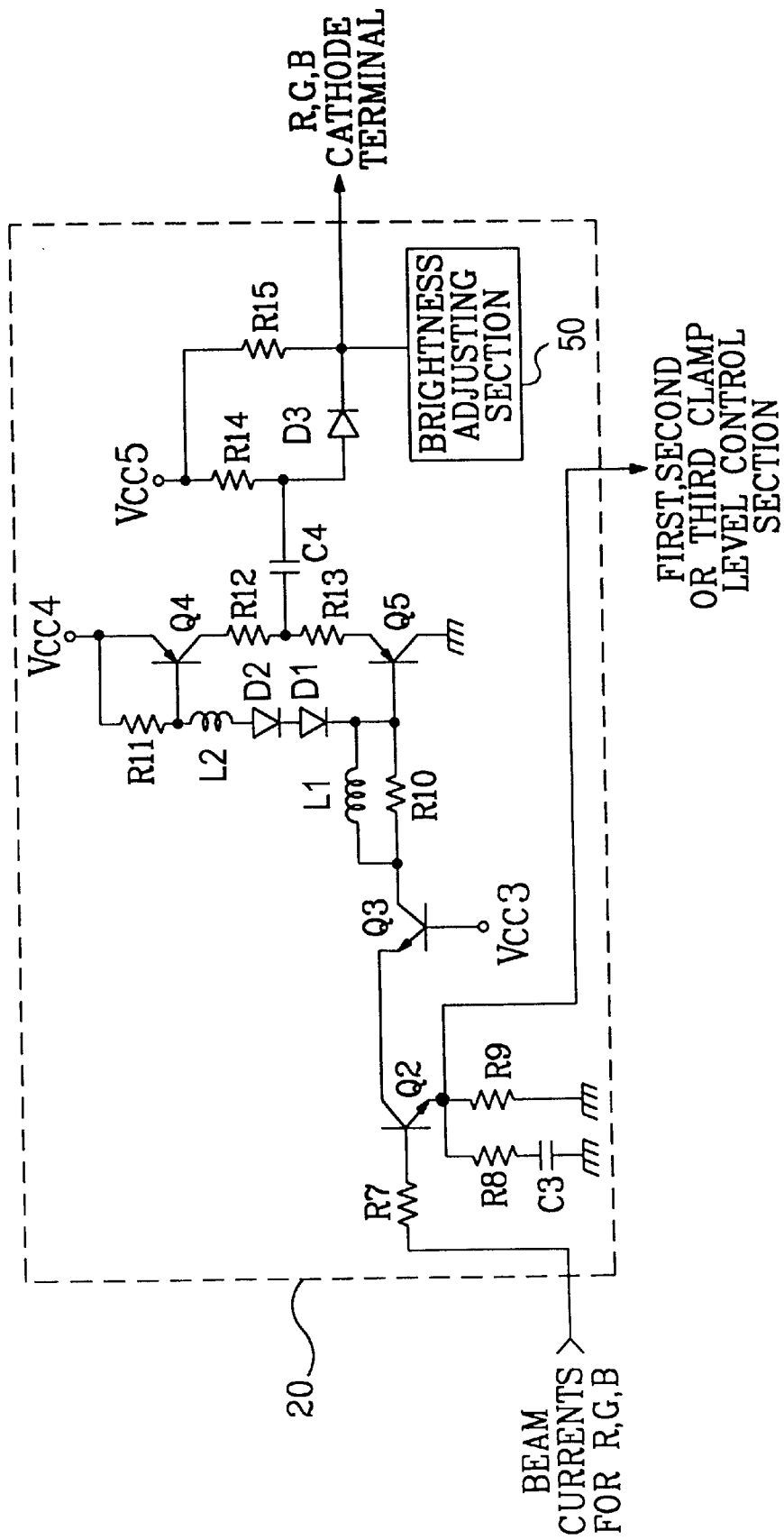
FIG. 2 is a circuit diagram showing the first, second and third video output sections of FIG. 1.
Figure 3:
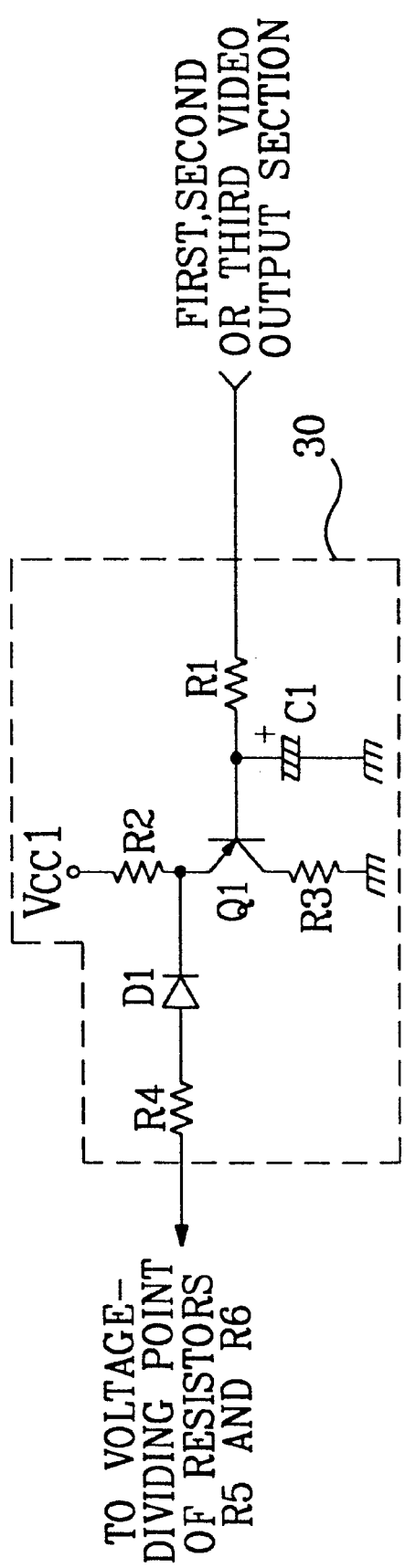
FIG. 3 is a circuit diagram showing the first, second and third clamp level control sections of FIG. 1.

FIG. 1 illustrates the video stabilizing circuit of the display apparatus according to the present invention. FIG. 2 is a circuit diagram showing the first, second and third video output sections of FIG. 1. FIG. 3 is a circuit diagram showing the first, second and third clamp level control sections of FIG. 1.

The video stabilizing circuit for a display apparatus according to the present invention includes: a video pre-amplifier 10 for adjusting brightness by controlling clamp levels of R, G and B chromatic signals, the chromatic signals being inputted in accordance with potentials of cut-off control terminals; first, second and third video output sections 20, 21 and 22 for amplifying the chromatic signals after their brightness adjustments by the video pre-amplifier 10, for wave-shaping them, and for dc-coupling them so as to output them to a cathode ray tube (CRT) 40; and first, second and third clamp level control section 30, 31 and 32 for sensing beam currents of R, G and B chromatic signals during their inputting into the first, second and third video output sections 20, 21 and 22 so as to automatically adjust potentials of the cut-off control terminals of the video pre-amplifier 10.

The first, second and third video output sections 20, 21 and 22 are constituted as follows. Referring to FIG. 2, each of the first, second and third video output sections 20, 21 and 22 includes: a switching device Q2 which has a base resistor R7 for receiving beam currents of R, G, B chromatic signals from video pre-amplifier 10 (FIG. 1), a collector connected to further switching device Q3, and an emitter which is grounded via resistor-capacitor combination R8, C3 and resistor R9, the emitter providing an output to the first, second and third clamp level control sections 30, 31 and 32; switching device Q3 which has a base for receiving supply voltage Vcc3, an emitter connected to the collector of switching device Q2, and a collector providing an output via parallel-connected inductor L1 and resistor R10 to the base of further switching device Q5; switching device Q5 having its base additionally connected via diodes D1 and D2, inductor L2 and resistor R1 to supply voltage Vcc4, a collector connected to ground, and an emitter connected via resistors R13 and R12 to the collector of further switching device Q4, and via resistor R13, capacitor C4 and diode D3 to the R, G, B cathode terminal of CRT 40 (FIG. 1); and switching device Q4 having its base connected via inductor L2 and diodes D1 and D2 to the base of switching device Q5, its emitter connected to supply voltage Vcc4, and its collector connected via resistors R12 and R13 to the emitter of switching device Q5, and via resistor R12, capacitor C4 and diode D3 to the R, G, B cathode terminal of CRT 40 (FIG. 1). As seen in FIG. 2, a supply voltage Vcc5 is also connected via resistor R14 to the junction between capacitor C4 and diode D3, and via resistor R15 to the junction between diode D3, brightness adjusting section 50 and the R, G, B cathode terminal of CRT 40 (FIG. 1). Switching devices Q2 and Q3 are, preferably, NPN transistors, while switching devices Q4 and Q5 are, preferably, PNP transistors.

The first, second and third clamp level control sections 30, 31 and 32 are constituted as follows. Referring to FIG. 3, each of the first, second and third clamp level control sections 30, 31 or 32 includes: a rectifying circuit R1 and C1 for rectifying beam currents of R, G, B signals incoming from the video output section 20, 21 or 22; a switching device Q1 for carrying out switching in accordance with the rectification values of the rectifying circuit R1 and C1; and a cut-off level adjusting circuit R4 and D1 for raising the potential level of a cut-off terminal of the video pre-amplifier 10 during a turning-on of the switching device Q1 so as to raise a clamp dc level of the video pre-amplifier 10.

The switching device Q1 is turned off when the beam currents of the R,G,B chromatic signals are large, and is turned on when the beam currents of the R,G,B chromatic signals are small, thereby controlling the clamp dc level of the video pre-amplifier. The switching device Q1 is, preferably, a PNP transistor.

Meanwhile, the cut-off level adjusting circuit R4 and D1 raises the bias level of the video output when the beam currents of the R,G,B chromatic signals outputted by the video output section 20, 21 or 22 are small by virtue of the turning-on of the switching device Q1.

Under this condition, when the beam currents of the R,G,B chromatic signals outputted by the video output section 20, 21 or 22 are large, the switching device Q1 is turned off. Consequently, the potential levels of the cut-off control terminals are lowered by resistors R5, R6 and a capacitor C2 and, therefore, the bias level of the video output is lowered.

The operation of the video stabilizing circuit of the display apparatus of the present invention will now be described with reference to the attached drawings.

The operating principles of the video stabilizing circuit are applicable to all the R, G and B chromatic signal terminals, and, therefore, only the R chromatic signal terminal, first video output section 20 and first clamp level control section 30 will be specifically described. Respective blocks 21, 22, 31 and 32 and the G, B chromatic signal output terminals will not be specifically described since their operating principles are the same.

The R chromatic signals are inputted from a video card to the video pre-amplifier 10. The inputted R chromatic signals are provided with bias voltages in accordance with the clamp levels which are determined in accordance with the potentials of the cut-off control terminals of the video pre-amplifier 10. Then, the R chromatic signals are inputted to the video output section 20.

The video output section 20 amplifies the incoming R chromatic signals by means of the transistors Q2 and Q3, wave-shapes the amplified signals by means of the transistors Q4 and Q5 (single-ended push-pull amplifiers) to form stabilized signals, and dc-couples to convert them into dc signals by means of the capacitor C4. The R chromatic signals are then supplied through the resistors R14 and R15 and the diode D3 to the red cathode of the CRT 40 (FIG. 1).

When high brightness beams are displayed, that is, when the high beams are inputted into the CRT 40, the video output bias voltages fluctuate, with the result that the brightness fluctuates. Under this condition, in order to maintain the output bias voltages at a constant level, the cut-off voltages of the video pre-amplifier 10 are adjusted.

In order to adjust the cut-off voltages, the beam currents of the R chromatic signals provided to the video output section 20 are fed back to the first clamp level control section 30 so as to be rectified by rectifying circuit R1, C1 (FIG. 3). The beam currents of the feedback R chromatic signals are then converted into dc voltages by the rectifying circuit R1, C1 of the clamp level control section 30.

The voltages which have been rectified by the rectifying circuit R1, C1 drive switching device Q1 (a PNP transistor) of the clamp level control section 30, thereby adjusting the potential of the cut-off control terminal of the video pre-amplifier 10. That is, if the beam currents which are fed back from the first video output section 20 are large, the switching device Q1 of the first clamp level control section 30 is turned off. As a result, the potential of the cut-off terminal of the video pre-amplifier 10 is lowered, and the bias voltage of the R chromatic signals is lowered.

On the other hand, if the beam currents which are fed back from the first video output section 20 are small, the switching device Q1 of the first clamp level control section 30 is turned on. Consequently, the potential of the cut-off terminal of the video pre-amplifier 10 is raised, and therefore, the bias voltage of the R chromatic signals is heightened.

The bias voltages of the R chromatic signals provided to the video pre-amplifier 10 are stabilized by the cut-off voltages which have been adjusted by the clamp level control section 30. Therefore, the video signals which are outputted through the video output section 20 to the CRT 40 (FIG. 1) are displayed with a constant brightness regardless of the wildly fluctuating low or high beams.

That is, the R chromatic signals which have been outputted from the video pre-amplifier 10, and which have been sensed by the clamp level control section 30, are fed back. Thus, the potential of the cut-off terminal of the video pre-amplifier 10 is adjusted in such a manner that, if the magnitude of the sensed beam current is large, then the bias voltage of the R chromatic signal is made small.

Therefore, the clamp dc levels of the video pre-amplifier 10 can be automatically controlled by utilizing the respective beam currents of the R,G,B chromatic signals which are outputted from the video pre-amplifier 10.

According to the present invention as described above, the clamp levels of R, G and B chromatic signals are controlled by feeding back the output currents of respective R, G and B terminals, so that real time responses can be made as against the fluctuations of video output load. Therefore, during a high brightness display, the fluctuations of the brightness of the high beams and low beams can be improved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A video stabilizing circuit for a display apparatus which includes a cathode ray tube, said circuit comprising:
    a video pre-amplifier for adjusting brightness by controlling clamp levels of chromatic signals, the chromatic signals being inputted in accordance with potentials of cut-off control terminals;
    a plurality of video output sections for amplifying the chromatic signals after their brightness adjustments by said video pre-amplifier, for wave-shaping them, and for dc-coupling them so as to output them to said cathode ray tube; and
    a plurality of clamp level control sections for sensing beam currents of the chromatic signals as provided to said video output sections so as to automatically adjust the potentials of said cut-off control terminals of said video pre-amplifier.

2. A video stabilizing circuit as claimed in claim 1, wherein each said clamp level control section comprises:
    a rectifying circuit for rectifying the beam currents of the chromatic signals as provided to one of said video output sections;
    a switching device for carrying out switching in accordance with at least one rectification value of said rectifying circuit; and
    a cut-off level adjusting circuit for raising a potential level of one of the cut-off control terminals of said video pre-amplifier during a turning-on of said switching device so as to raise a clamp dc level of said video pre-amplifier.

3. A video stabilizing circuit as claimed in claim 2, wherein said switching carried out by said switching device controls the clamp dc level of said video pre-amplifier.

4. A video stabilizing circuit as claimed in claim 3, wherein said switching device comprises a PNP transistor.

5. A video stabilizing circuit as claimed in claim 3, wherein said cut-off level adjusting circuit lowers a bias level of a video output in accordance with the beam currents of the chromatic signals outputted by said one of said video output sections.

6. A video stabilizing circuit as claimed in claim 2, wherein said switching device comprises a PNP transistor.

7. A video stabilizing circuit as claimed in claim 1, wherein said chromatic signals comprise R, and B signals, said plurality of video output sections comprises three video output sections, and said plurality of c lamp level control sections comprises three clamp level control sections.

8. A video stabilizing circuit for a display apparatus which includes a cathode ray tube, comprising:
    video pre-amplifier means including cut-off control terminals for adjusting brightness by controlling clamp levels of chromatic signals inputted from a video card, and for providing adjusted chromatic signals as an output;
    video output means for amplifying the adjusted chromatic signals from said video preamplifier means, for wave-shaping them, for dc-coupling them so as to output them to said cathode ray tube, and for providing feedback chromatic signals; and
    clamp level control means responsive to said feedback chromatic signals for adjusting potentials of said cut-off control terminals of said video pre-amplifier means.

9. A video stabilizing circuit as claimed in claim 8, wherein said clamp level control means comprises:
    a rectifying circuit for rectifying the feedback chromatic signals from said video output means;
    a switching device for carrying out switching in accordance with at least one rectification value of said rectifying circuit; and
    a cut-off level adjusting circuit for raising a potential level of one of the cut-off control terminals of said video pre-amplifier means during a turning-on of said switching device so as to raise a clamp dc level of said video pre-amplifier means.

10. A video stabilizing circuit as claimed in claim 9, wherein said switching carried out by said switching device controls the clamp dc level of said video pre-amplifier means.

11. A video stabilizing circuit as claimed in claim 10, wherein said switching device comprises a PNP transistor.

12. A video stabilizing circuit as claimed in claim 10, wherein said cut-off level adjusting circuit lowers a bias level of a video output in accordance with the beam currents of the feedback chromatic signals of said video output means.

13. A video stabilizing circuit as claimed in claim 9, wherein said switching device comprises a PNP transistor.

14. A video stabilizing circuit as claimed in claim 8, wherein said chromatic signals comprise R, G and B signals, said video output means comprises three video output sections, and said clamp level control means comprises three clamp level control sections.

15. A video stabilizing circuit as claimed in claim 8, wherein the chromatic signals are inputted to said video pre-amplifier means in accordance with the potentials of said cutoff control terminals.

16. A video stabilizing circuit as claimed in claim 15, wherein said clamp level control means senses beam currents of the chromatic signals during input of said chromatic signals to said video output means.

17. A video stabilizing circuit as claimed in claim 8, wherein said clamp level control means senses beam currents of the chromatic signals during input of said chromatic signals to said video output means.

18. A video stabilizing circuit as claimed in claim 2, wherein said rectifying circuit comprises a resistor connected to one of said video output sections and a capacitor connected between said resistor and ground.

19. A video stabilizing circuit as claimed in claim 2, wherein said switching device comprises a transistor having a base, an emitter and a collector, and first and second resistors, said base being connected to said rectifying circuit, said emitter being connected via said first resistor to a voltage supply, and said collector being connected via said second resistor to ground.

20. A video stabilizing circuit as claimed in claim 2, wherein said cut-off level adjusting circuit comprises a diode and a resistor connected in series between said switching device and one of said cut-off control terminals.

21. A video stabilizing circuit as claimed in claim 1, wherein each said video output section comprises a first switching device for receiving the chromatic signals from said video pre-amplifier and providing a first output, a second switching device for receiving the first output and providing a second output, a third switching device for receiving the second output and providing a third output, a fourth switching device connected to said third switching device and providing a fourth output, and a coupling circuit for coupling the third and fourth outputs to the cathode ray tube.

22. A video stabilizing circuit as claimed in claim 21, wherein said first and second switching devices amplify the chromatic signals.

23. A video stabilizing circuit as claimed in claim 22, wherein said third and fourth switching devices wave shape the amplified chromatic signals to form stabilized signals.

24. A video stabilizing circuit as claimed in claim 23, wherein said coupling circuit converts the stabilized signals into direct current signals for provision to the cathode ray tube.

25. A video stabilizing circuit as claimed in claim 9, wherein said rectifying circuit comprises a resistor connected to said video output means and a capacitor connected between said resistor and ground.

26. A video stabilizing circuit as claimed in claim 9, wherein said switching device comprises a transistor having a base, an emitter and a collector, and first and second resistors, said base being connected to said rectifying circuit, said emitter being connected via said first resistor to a voltage supply, and said collector being connected via said second resistor to ground.

27. A video stabilizing circuit as claimed in claim 9, wherein said cut-off level adjusting circuit comprises a diode and a resistor connected in series between said switching device and one of said cut-off control terminals.

28. A video stabilizing circuit as claimed in claim 8, wherein said video output means comprises a first switching device for receiving the chromatic signals from said video pre-amplifier means and providing a first output, a second switching device for receiving the first output and providing a second output, a third switching device for receiving the second output and providing a third output, a fourth switching device connected to said third switching device and providing a fourth output, and a coupling circuit for coupling the third and fourth outputs to the cathode ray tube.

29. A video stabilizing circuit as claimed in claim 28, wherein said first and second switching devices amplify the chromatic signals.

30. A video stabilizing circuit as claimed in claim 29, wherein said third and fourth switching devices wave shape the amplified chromatic signals to form stabilized signals.

31. A video stabilizing circuit as claimed in claim 30, wherein said coupling circuit converts the stabilized signals into direct current signals for provision to the cathode ray tube.

* * * * *